(12) United States Patent
Schauer et al.

(10) Patent No.: US 10,037,064 B2
(45) Date of Patent: Jul. 31, 2018

(54) ENHANCED RE-HOSTING CAPABILITY FOR LEGACY HARDWARE AND SOFTWARE

(71) Applicant: APPLIED MATERIALS, INC., Santa Clara, CA (US)

(72) Inventors: Ronald Vern Schauer, Gilroy, CA (US); Mark Roger Covington, Sunnyvale, CA (US); Suresh Kumaraswami, Bangalore (IN); Amitabh Puri, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 15/194,270

(22) Filed: Jun. 27, 2016

(65) Prior Publication Data

US 2016/0306403 A1 Oct. 20, 2016

Related U.S. Application Data

(62) Division of application No. 13/771,870, filed on Feb. 20, 2013, now Pat. No. 9,383,739.

(Continued)

(51) Int. Cl.
*G06F 1/30* (2006.01)
*G06F 1/26* (2006.01)
(Continued)

(52) U.S. Cl.
CPC ............ *G06F 1/263* (2013.01); *G05B 19/02* (2013.01); *G06F 9/45508* (2013.01);
(Continued)

(58) Field of Classification Search
None
See application file for complete search history.

(56) References Cited

U.S. PATENT DOCUMENTS 5,712,779 A 1/1998 Sheppard et al.
5,917,840 A 6/1999 Cheney et al.
(Continued)

FOREIGN PATENT DOCUMENTS

CN 10-2197454 A 9/2011
CN 104160383 A 11/2014
(Continued)

OTHER PUBLICATIONS

U.S. Appl. No. 13/771,870, "Non-Final Office Action", dated Sep. 21, 2015, 17 pages.
(Continued)

*Primary Examiner* — Ilwoo Park
(74) *Attorney, Agent, or Firm* — Kilpatrick Townsend & Stockton LLP

(57) ABSTRACT

Embodiments of the invention are directed toward systems and methods that execute legacy semiconductor applications using a non-legacy controller. In some embodiments a hardware abstraction layer and/or an emulator can be used to provide communication between a non-legacy operating system and legacy components including legacy applications. In some embodiments various methods and/or devices can be used to emulate and/or translate communications between legacy and non-legacy components.

18 Claims, 9 Drawing Sheets

Related U.S. Application Data

(60) Provisional application No. 61/601,493, filed on Feb. 21, 2012.

(51) Int. Cl.
   *G06F 9/455* (2018.01)
   *G06F 13/10* (2006.01)
   *G05B 19/02* (2006.01)
   *H02J 4/00* (2006.01)

(52) U.S. Cl.
   CPC ............. *G06F 13/105* (2013.01); *H02J 4/00* (2013.01); *Y10T 307/406* (2015.04)

(56) References Cited

U.S. PATENT DOCUMENTS

| | | | |
|---|---|---|---|
| 6,032,203 A | 2/2000 | Heidhues | |
| 6,366,656 B1 | 4/2002 | Lee et al. | |
| 6,395,240 B1* | 5/2002 | Fujii | H01L 21/67393 422/186.3 |
| 6,628,207 B1* | 9/2003 | Hemminger | H02J 9/061 324/110 |
| 2003/0033593 A1 | 2/2003 | Duesterwald et al. | |
| 2004/0039960 A1* | 2/2004 | Kassayan | G06F 11/1441 714/14 |
| 2004/0255978 A1 | 12/2004 | Fury et al. | |
| 2005/0049729 A1* | 3/2005 | Culbert | G06F 1/206 700/50 |
| 2006/0108544 A1* | 5/2006 | Richards | H01J 37/241 250/492.21 |
| 2007/0008968 A1 | 1/2007 | Baker et al. | |
| 2008/0288928 A1 | 11/2008 | Bowers et al. | |
| 2008/0288929 A1 | 11/2008 | He et al. | |
| 2010/0138583 A1 | 6/2010 | Schauer et al. | |
| 2012/0093024 A1 | 4/2012 | Kilian et al. | |
| 2012/0261217 A1* | 10/2012 | Agirman | B66B 5/027 187/290 |
| 2013/0018484 A1* | 1/2013 | Schultz | G05B 19/05 700/7 |
| 2013/0339757 A1* | 12/2013 | Reddy | G06F 1/3212 713/300 |
| 2014/0152103 A1 | 6/2014 | Schauer et al. | |

FOREIGN PATENT DOCUMENTS

| | | | |
|---|---|---|---|
| CN | 107515830 | | 12/2017 |
| EP | 1283465 | A2 | 2/2003 |
| EP | 2817720 | A1 | 12/2014 |
| JP | 2003108388 | A | 4/2003 |
| JP | 2005-80475 | * | 3/2005 |
| JP | 2007524228 | A | 8/2007 |
| JP | 2015511362 | | 4/2015 |
| KR | 20080026831 | A * | 3/2008 |
| KR | 1020147026309 | A | 11/2014 |
| TW | 200602887 | A | 1/2006 |
| TW | 201351281 | A | 12/2013 |
| WO | 2013126431 | A1 | 8/2013 |

OTHER PUBLICATIONS

U.S. Appl. No. 13/771,870, "Notice of Allowance", dated Apr. 18, 2016, 5 pages.

Bojic, et al., "REFMAP: Restructuring by Feature Mapping", EUROCON, vol. 1, Nov. 22, 2005, pp. 728-731.

EP13751134.1, "European Search Report", dated Feb. 12, 2016, 4 pages.

EP13751134.1, "Office Action", dated Mar. 23, 2016, 5 pages.

Obermaisser, "Reuse of CAN-Based Legacy Applications in Time-Triggered Architectures", IEEE Transactions on Industrial Informatics, vol. 2, No. 4, Nov. 2006, pp. 255-268.

PCT/US2013/026908, "International Preliminary Report on Patentability", dated Sep. 4, 2014, 12 pages.

PCT/US2013/026908, "International Search Report and Written Opinion", dated Jun. 13, 2013, 11 pages.

Smith, et al., "The architecture of virtual machines", Computer, vol. 38, No. 5, May 2005, pp. 32-38.

Office Action dated Jul. 5, 2016 in Chinese Paten Application No. 201380012269.5, 8 pages.

Obermaisser, "Reuse of CAN-Based Legacy Applications in Time—Triggered Architecture", IEEE Transactions on Industrial Informatics (vol. 2 , Issue: 4 ), Nov. 13, 2006, pp. 255-268.

TW102106047, "Office Action", dated Jul. 29, 2016, 8 pages.

JP2014-558802, "Office Action", dated Dec. 20, 2016, 4 pages.

TW102106047, "Office Action", dated Dec. 28, 2016, 2 pages.

* cited by examiner

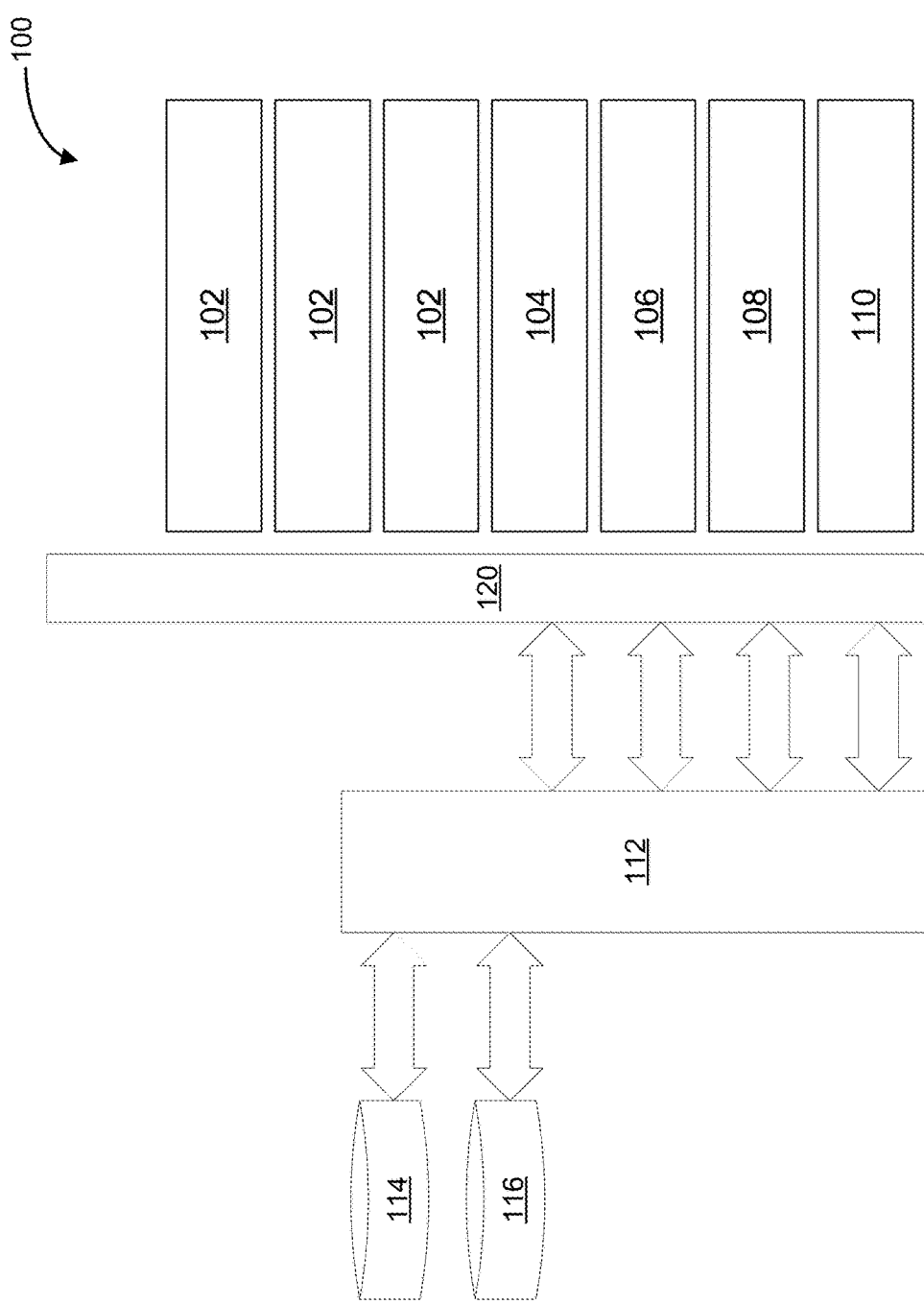

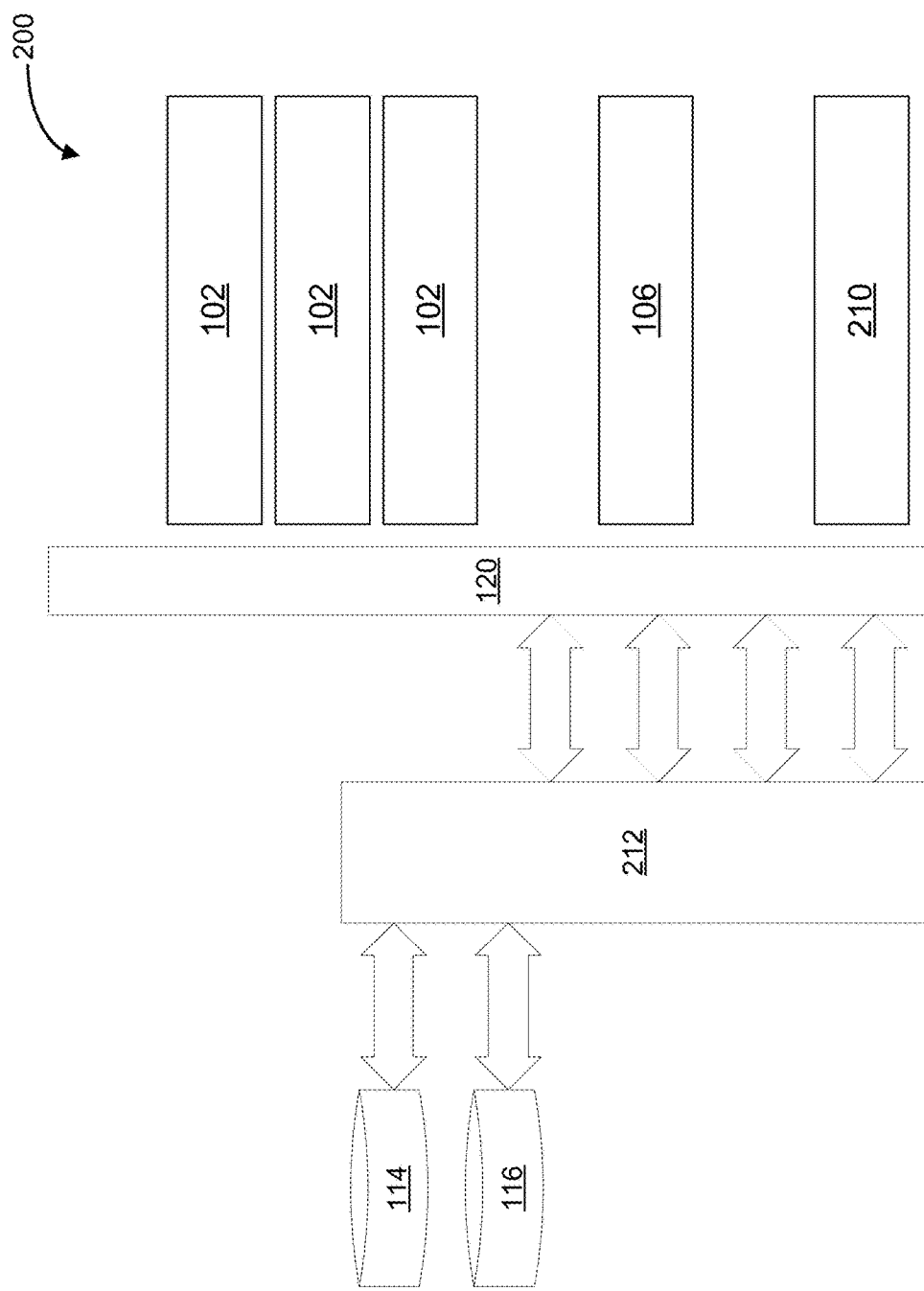

ENHANCED RE-HOSTING CAPABILITY FOR LEGACY HARDWARE AND SOFTWARE

CROSS-REFERENCES TO RELATED APPLICATIONS

This application is a divisional application of U.S. application Ser. No. 13/771,870, filed on Feb. 20, 2013, which claims priority to U.S. Provisional Application No. 61/601,493, filed on Feb. 21, 2012, the disclosures of which are hereby incorporated by reference in their entirety for all purposes.

BACKGROUND OF THE INVENTION

The present invention relates generally to substrate processing and, more particularly, to control systems for semiconductor processing tools.

The fabrication of semiconductor devices, such as integrated circuits, flat panel displays, solar panels and other products often involves the formation of very thin layers and the patterning of such layers on a substrate, such as a silicon wafer or glass panel. Various techniques have been developed for semiconductor deposition and patterning processes that involve the use of sophisticated tools to carry out the necessary deposition, etching and other processing steps.

Manufacturers invest considerable sums of money in purchasing such tools. They also invest considerable sums of money in maintaining the tools and optimizing and qualifying the various the processing steps performed by each tool. Once a process performed by a particular tool has been optimized and qualified for a particular task (e.g., depositing a silicon oxide layer at a particular manufacturing step of an IC) any change to the process often requires that the changed process be requalified—an expensive and time consuming process. Thus, it may be desirable in some instances to have a particular tool perform the same function over the course of many years.

As a given tool gets older, however, some parts may be required to service the tool may no longer be available. For example, chemical vapor deposition (CVD) tool may include a computer control system that includes, among other components, a computer processor, RAM and hard disk memory storage and various I/O interfaces, such as a light pen display interface, that allow information to be exchanged between the tool and the control system and/or allow a user to input information to operate the tool. Certain semiconductor processes that run off the tool may be timed based on an algorithm that is dependent on the speed of processor or other variables that depend on the original components of the computer control system. As those original components are phased out of manufacture, replacing the components with new ones that perform the same or similar functions may have an undesirable impact on the timing or other variables of the process performed by the tool. This might require that the process be requalified, recalibrated, retested, etc., which can be very expensive and time consuming.

BRIEF SUMMARY OF THE INVENTION

Embodiments of the present invention pertain to a semiconductor process control system that can be incorporated into legacy semiconductor process control systems and interact with legacy semiconductor fabrication tools. The word "legacy" refers to any semiconductor control system that has components that are obsolete (no longer available) or needs additional capabilities added to it while fully supporting existing capabilities. The semiconductor process control system can replace a legacy semiconductor process control system in a seamless manner that allows all previously developed processes and recipes to be executed without change in the processing functions while providing new and improved functionality.

One particular embodiment of the invention pertains to a semiconductor process controller, which may be implemented as a single board computer (SBC). This single board computer can replace at least a part of a legacy semiconductor process control system and/or be adapted to control a substrate processing tool. In some embodiments of the invention, the SBC can include a light pen video control module; a legacy controller module that emulates a 68xxx-based controller executing a first operating system (e.g., a Motorola-based or VME-based operating system); a second control module that executes a second operating system different from the first operating system (e.g., an Intel-based or PCI-based operating system); and a data storage module. In some embodiments, the first operating system and the second operating system can operate on the same processor or on different processors. In some embodiments, one operating system can emulate at least portions of the other operating system.

In some embodiments, the SBC can also include a backplane bus interface that can include a first connector that allows the SBC to be connected to various portions of the larger control system. The SBC also includes a plurality of legacy I/O ports (including at least 16 RS-232 serial ports, first and second USB ports, and first and second Ethernet ports) and/or a second plurality of I/O ports (including at least third and fourth USB ports, third and fourth Ethernet ports, and a VGA video port).

A second connector that includes a sufficient number of pins to support connections to each of the plurality of legacy I/O ports is operatively coupled to the plurality of legacy I/O ports. In some embodiments separate and distinct connectors can be associated with each of the ports in the second plurality of I/O ports such that the SBC includes a USB connector for each of the third and fourth USB ports. An Ethernet connector for each of the third and fourth Ethernet ports and a VGA connector for the VGA video port can also be included. The SBC can include a number of I/O ports and connectors in addition to those specifically mentioned. The SBC can include a PCI bus operatively connected to allow communication between the light pen video control module, the legacy controller module, the second control module, the mass data storage module, the Backplane bus interface and the plurality of legacy I/O ports.

Various embodiments of the invention along with many of its advantages and features are described in more detail in conjunction with the text below and attached figures.

BRIEF DESCRIPTION OF THE DRAWINGS

FIG. 1 is a block diagram of a computer control legacy semiconductor control system 100 incorporated into a number of legacy semiconductor processing tools;

FIG. 2 is a block diagram of a computer semiconductor processing control system 200 according to one embodiment of the present invention;

DETAILED DESCRIPTION OF THE INVENTION

Figure 3A:
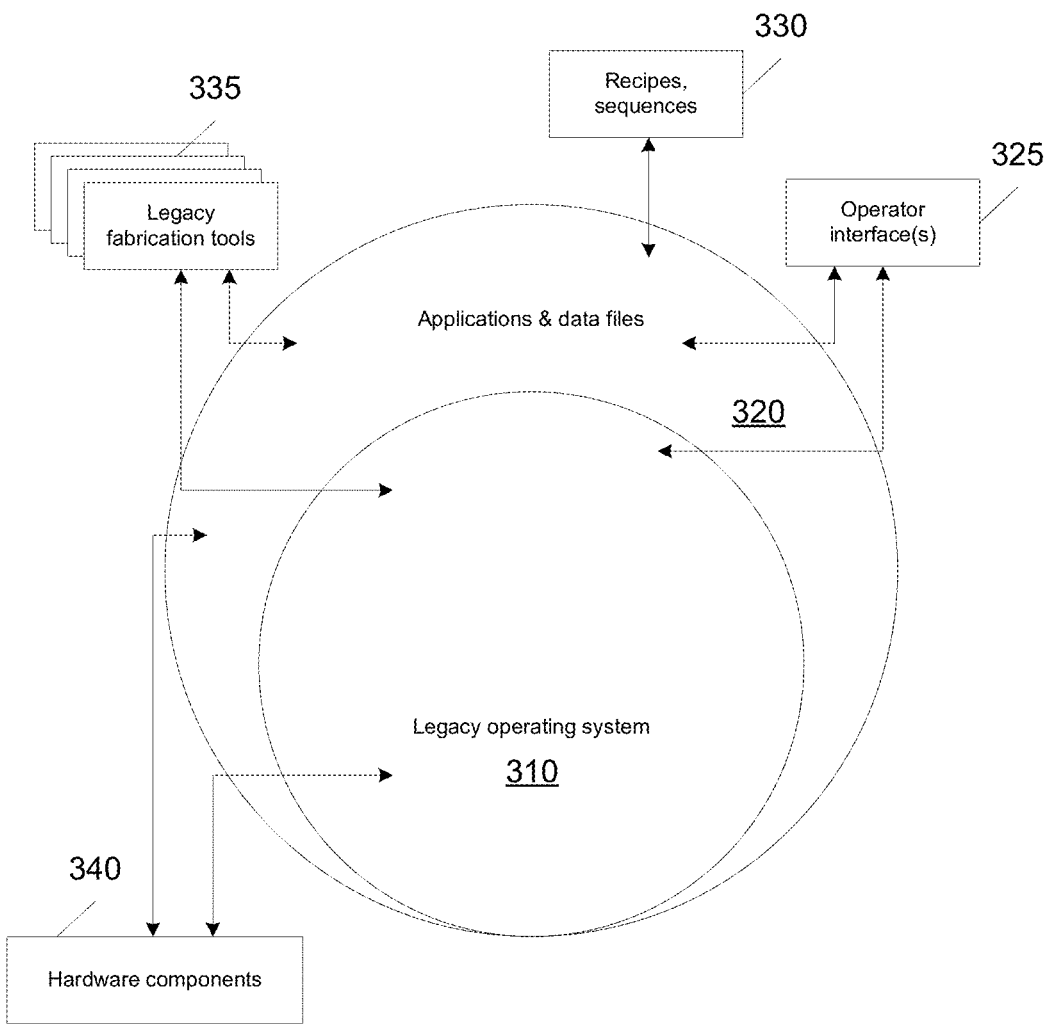
FIG. 3A shows an abstraction of a typical control system with an operating system that interfaces with applications and data files.

In order to better appreciate and understand the present invention reference is first made to FIG. 1, which is a block diagram of a legacy semiconductor control system 100 that is capable of controlling the operation of one or more semiconductor fabrication tools. A legacy semiconductor fabrication tool can be referred to herein as a "legacy fabrication tool". These legacy fabrication tools communicate with the legacy semiconductor control system using legacy communication protocols often related to a legacy controller.

Legacy semiconductor control system 100 is an example of a system that may be used to control one or more legacy fabrication tools currently in operation in semiconductor fabrication facilities around the world. In contrast to some newer control systems, this tool provides a central point of control that can control the operation of semiconductor fabrication chambers as well as any central robot system that transfers wafers into and out of the legacy fabrication tool as well as between different chambers. Thus, individual chambers in the multi-chamber legacy fabrication tool generally do not require or include their own independent control system.

As shown in FIG. 1, legacy semiconductor control system 100 includes multiple cards and processing elements that can be mounted in a rack and communicate with each other through a backplane bus 120. In the specific implementation shown in FIG. 1, legacy semiconductor control system 100 includes three I/O cards 102, a video controller 104, a specialized composite I/O card 106 that provides up to two Seriplex channels (typically 14 standard RS-232 communications channels and two RS-485 channels), a high speed messaging (HSMS) card 108 and single board computer (SBC) 110 that are all connected to backplane bus 120. A rear transition module (RTM) 112 is also provided that connects shared memory devices, such as a hard disk drive (HDD) 114 and a floppy disk drive 116 to legacy semiconductor control system 100.

HSMS card 108 provides a physical transport over Ethernet allowing high speed messaging for the legacy fabrication tool at rates of 100 Mbits/second and higher. Within legacy semiconductor control system 100, however, shared memory (e.g., HDD 114) that can store operational data collected via HSMS card 108 on process recipes executing on the legacy fabrication tool within individual chambers is connected to HSMS card 108 over the backplane bus 120. The backplane bus connection is a severe bottleneck for such data transfers that impairs and/or limits the functionality of legacy semiconductor control system 100. Additionally, SBC 110 includes a legacy controller (e.g., a Motorola 68xxx processor) processing a legacy operating system (BOSS). In some embodiments this legacy controller may not use interrupts for its file storage system. The legacy operating system may also use proprietary storage file formats that may have any number of restrictions such as limitations on file size capabilities and/or can be tailored to address unique user interface hardware and specific and unique configurations and types of ports and other hardware associated with the legacy fabrication tools. The application software for legacy semiconductor control system 100 can be intimately tied to the legacy operating system, its command structure and feature set. Because of this, communication between the legacy semiconductor control system 100 and semiconductor fabrication tools can be based on protocols dictated by the legacy operating system.

In many instances, systems similar to or identical to legacy semiconductor control system 100 have been used to control the operation of one or more legacy semiconductor fabrication tools for many years. Frequently a considerable amount of engineering effort has been put into optimizing and qualifying various processing steps performed within each processing chamber of each legacy fabrication tool as part of the semiconductor fabrication process. Thus, there are often strong financial and other considerations for the owner of the legacy fabrication tool to continue to operate the tool in the same manner over an extended period of time. The effective lifetime of a given legacy fabrication tool, however, is often longer than the lifetime of some of its parts including many of the electronic parts associated with legacy semiconductor control system 100. The legacy fabrication tool may execute certain processes that are timed or otherwise directly linked in some performance metric to the particular hardware associated with legacy semiconductor control system 100.

Technology changes rapidly in the computer and IT fields which make it more and more difficult to find replacement parts for certain components of legacy semiconductor control system 100. As one example, legacy semiconductor control system 100 may include a cathode ray tube display (not shown) that operates with a light pen to allow a user to input information to operate the tool. Light pen technology is rapidly being replaced by touch screen and other technologies so it has become increasingly difficult to find a replacement part for video controller 104. Conversely, however, legacy semiconductor control system 100 has been programmed to rely heavily on receiving control data via the light pen interface and it would require considerable programming effort to reprogram the entire system to work with a different interface.

Additionally the same changes in technology that may obsolete some of the components of legacy semiconductor control system 100 would enable performance improvements in a given legacy fabrication tool that legacy semiconductor control system 100 is part of, or otherwise be beneficial for the operation of such a tool, but for the limitations in processing power, memory or other features of legacy semiconductor control system 100. Since upgrading the computer control system of a legacy fabrication tool to a newer system that has a faster processor, more memory and/or additional features than legacy semiconductor control system 100 may require reprogramming certain software that controls the tool and/or requalification of certain processes that run on the tool, such an upgrade is generally not desirable.

The inventors have come up with a solution that addresses each of these issues. To better understand the solution, reference is made to FIG. 2, which is a block diagram of a semiconductor processing control system 200 according to one embodiment of the present invention. Similar to legacy semiconductor control system 100, semiconductor processing control system 200 provides a central point of control that controls the operation of each one of the multiple chambers as well as any central robot system that transfers wafers into and out of the legacy fabrication tool as well as between different chambers. Semiconductor processing control system 200 replaces a number of components, for example, video controller 104, high speed messaging card 108 and legacy SBC 110 of legacy semiconductor control system 100 with a novel and improved SBC 210. Within semiconductor processing control system 200 the entire environment of legacy semiconductor control system 100 can be replicated so that process recipes, sequences and monitoring loops written for a legacy fabrication tool can be executed by semiconductor processing control system 200 without requiring that source code to be re-compiled and while entailing minimal (if any) changes to the remaining product hardware. Additionally, semiconductor processing control system 200 can emulate the legacy operator interface of legacy semiconductor control system 100 which allows the continued use of, among other items, previously prepared installation materials, documentation, operator training, safety, process and tool management tools.

While semiconductor processing control system 200 can replicate the environment of legacy semiconductor control system 100 it also provides numerous benefits beyond the functionality of legacy semiconductor control system 100. For example, semiconductor processing control system 200 can provide some or all of the following features: application protection (to protect the entire operating suite and its basic functionality); upgrades to the main control hardware memory (speed, size, reliability); increased central processing speed (reduced CPU loading); increases to material processing speed and capabilities by means of improved sequencing and robotic control methods; improved file handling capability and speed; improved electrical power sources and the management thereof; increased immunity to ESD, EMI and other physical threats to the tool's health and operation; improved connectivity (USB, EtherNet, I2C, PCI bus, SIO); improved cooling capabilities for usage in severe or neglected environments; additional connection points and methods to support future expansion and enhancements; enhanced ease of service and support (modern hardware, modern OS); remote connection, viewing and control capability; native hosting of semiconductor industry communications standards such as SECS, GEM and HSMS, multi-core CPU design allows for transparent process flow even during high data load periods and configuration; a novel OS interface and hardware migration path to address future obsolescence and supply issues because the legacy hardware and OS are both technical and commercial dead ends; automated messaging capabilities (e.g., sending an operator alert to a mobile device); graphical user assistance and teaching functions, including but not limited to a simulation mode option, lessons and tutorials; on-board productivity enhancement features and software aside from the basic operating software but capable of being executed simultaneously with it; tool configuration guides, software tools and tutorials; maintenance software tool suites and support; feature protection for individual enhancements and features, including compatibility with methods and processes used on newer generation substrate processing tools and beyond.

To ensure the integrity of semiconductor processing control system 200, hardware and software protection locks unique to each SBC and transition board such that they are mated in production and cannot be cloned or cross-connected to other SBCs or transition boards by other than extraordinary methods or unacceptable time frames may also be employed. In one embodiment the hardware/software protection locks can include some or all of the following: silicon ID numbers (globally unique identifiers); write-once memory locations; hidden and/or encrypted data files; CPU ID numbers; EtherNet port MacID numbers; USB port ID numbers; hardware keys or "dongles" and similar devices; hidden and/or locked drive directories containing lock information; incorporation of independent, redundant forms of data memory that are to be used to provide rapid backup and restoration capabilities.

Semiconductor processing control system 200 can incorporate hardware and software to automatically preserve customer data in the event of unscheduled power failures in situations where legacy semiconductor control system 100 would have instantly shut down with complete loss of customer data resident in volatile memory areas. Such preserved data can be used to improve processes and yields and is often as valuable or even more valuable to a customer than the semiconductor wafers. As an example, the data can sometimes be used to recover wafers whose processing was interrupted by loss of electrical power. If the data is lost, the wafers being processed may necessarily be scrapped. With the data recovered, however, after power is restored processing can take into account factors and variables associated with the power failure and continue with subsequent processing steps in order to produce useable ICs from the wafer that would have otherwise been scrapped.

SBC 210 can include hardware and/or software required by semiconductor processing control system 200 to replicate the environment required by legacy semiconductor control system 100 so that legacy applications and process recipes prepared for execution on legacy semiconductor control system 100 can be performed on semiconductor processing control system 200 without any changes. To this end, SBC 210 can emulate the physical connection points, names and functions of all components associated with the replaced legacy SBC 110, HSMS card 108 and video controller 104 creating a system that can duplicate on a register-for-register basis code that previously executed on the 68xxx processor of legacy SBC 110. SBC 210 can include an Intel-based processor. SBC 210 can include any or all elements shown in FIG. 8.

In some embodiments, SBC 210 can allow efficient and/or controlled time sharing of hardware resources such as hard drives, memory and I/O by methods including: time slice multi-tasking; priority-based multi-tasking; CPU core sharing; dedicated CPU cores for certain tasks (when multi-core SBC hardware is fitted); automatic encryption and decryption of critical data files and program modules to enhance security and prevent data loss or cloning (proprietary algorithms or standardized algorithms such as AES, DES, and so forth may be used); and automatic interfaces to feature and software protection devices, algorithms and hardware so that the software may be licensed or locked to a particular set of hardware.

In some embodiments, SBC 210 can include a multicore processor where one processor core is dedicated to providing the above described environmental replication including the execution of programs written for the legacy operating system and a second processor core provides computer control of the legacy fabrication tool using a new modern, Windows-based operating system that allows interrupts and provides a path forward for control of the legacy fabrication tool without legacy software and accommodates newer interface techniques and hardware such as USB, EtherNet, CAN bus (DeviceNet) and others. Thus, while SBC 210 strictly replicates the environment of legacy semiconductor control system 100 enabling the legacy fabrication tools to execute legacy software/processes without change, it also allows the legacy fabrication tools to be sourced, programmed and applied in a manner that does not require adherence to older legacy protocols or hardware set should any portion of that hardware set become unavailable in the future.

In some embodiments, SBC 210 can operate as part of a wrapper or shell (shown in abstract form in FIG. 3B) that is created around the hardware associated with semiconductor processing control system 200 to enable the system to perform all the operations previously performed by legacy semiconductor control system 100 in the same manner. The wrapper or shell may include binary operation code (op code) translators; memory address and range translators; bridges to the VME data and address busses on the host backplane; interrupt and direct memory access bridge drivers and handlers; CPU resource management functions to prevent loading issues, stalls and other faults that could adversely affect tool operation. The op code translator may further include various lookup tables; state machines; heuristic methods, both rule-based and fuzzy logic; look-ahead logic and code sequencing; and processor state and code timing synchronization.

FIG. 3A shows abstraction of legacy SBC 110. Operating system 310 interfaces with applications and data files 320. In doing so, operating system 310 processes applications and reads and stores data within data files. Operating system 310 and applications and data files 320 communicate using the same communication protocols. Various external interfaces can be communicatively coupled with operating system 310 and applications and data files 320. These can included, for example, operator interface(s) 325, recipes and/or sequences 330, legacy fabrication tool(s) 33, and/or various other hardware components 340 such as mainframes, hardware, robots, interlocks, etc. These interfaces can interface with operating system 310 and/or with application and data files 320. In some embodiments, as shown in the figure, legacy fabrication tool(s) 335, operator interfaces 325, and other hardware components 340 are each in communication with both operating system 310 and application and data files 320.

Figure 3B:
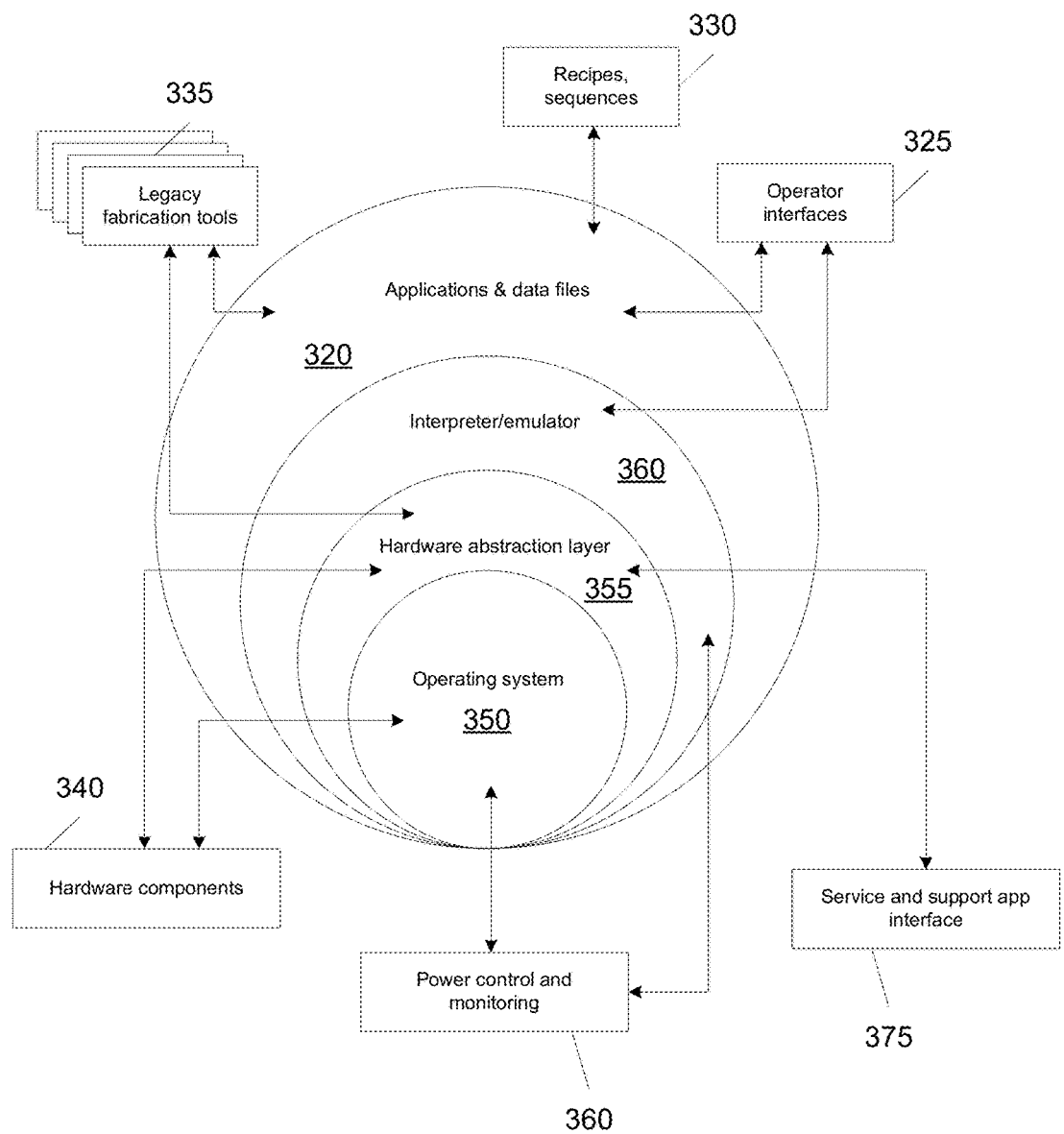
FIG. 3B shows an abstraction of a control system with an operating system that interfaces with applications and data files via an interpreter/emulator and/or a hardware abstraction layer.

FIG. 3B shows abstraction of SBC 210 that maintains legacy applications and data files 320 and interfaces with legacy fabrication tools yet operates using a modern operating system 350 according to some embodiments of the invention. That is, FIG. 3B, in abstraction, shows a semiconductor process control system that keeps legacy files and applications 320 but processes them using an operating system 350 that uses different communication, file storage, and/or processing protocols. Moreover, FIG. 3B, in abstraction, also shows a semiconductor process control system that controls legacy fabrication tools but does using operating system 350 that uses different communication, file storage, and/or processing protocols. For example, legacy files and application s 320 can be previously developed to execute in a Motorola-based commination protocol environment on operating system 310 as shown in FIG. 3A. FIG. 3B shows OS and hardware abstraction layer 355 and emulator layer 360 that can be used to interface files and applications 320 with operating system 350 that uses different protocols. In this way, the hardware and/or operating system can be upgraded, modified, modernized, etc. without changing the applications and data files 320 and/or interfaces with hardware components 340.

In some embodiments, emulator layer 360 can be implemented in hardware on one or more individual chips or in software. In some embodiments, emulator layer 360 can emulate the registers and/or memory of legacy operating system 310. In some embodiments, operating system 350 can communicate with legacy fabrication tools and/or other hardware components through emulator 360. In some embodiments, emulator layer 360 can translate Intel-based communication to Motorola-based communication and vice-versa. In some embodiments, emulator layer 360 can map memory from Intel-based memory addresses to Motorola-based memory addresses and vice-versa.

In some embodiments operator interface(s) 325 that are can retain legacy functionality to preserve the legacy communication with a user. To do so, operator interfaces 325 can also communicate directly with applications and data files 320. Operator interface 325 can communicate with operating system 350 through emulator layer 360 and/or hardware abstraction layer 355. In this way, operator interface(s) 325 can maintain legacy communication protocols as well as a legacy look and feel yet still work in conjunction with operating system 350.

Recipes and/or sequences 330 and legacy fabrication tool(s) 335 can communicate with applications and data files 320 without any interpretation, emulation and/or abstraction. Some legacy fabrication tool(s) 335 can communicate with operating system 350 through hardware abstraction layer 355 and/or can access applications and data files 320. Hardware abstraction layer 355 can provide communication abstraction between the legacy fabrication tool(s) 335 and operating system 350. For example, hardware abstraction layer 355 can convert communication protocols from one system to a next; for example, from an Intel-based communication protocol to a Motorola-based communication protocol and vice versa.

In some embodiments operating system 350 can send a regular message (e.g., a ping-like message) to each legacy fabrication tool 335. The legacy fabrication tool 335 may require reception of the regular message in order to not time out and/or shut down. A return regular message may also be sent from the legacy fabrication tool 335. In this way legacy fabrication tool(s) 335 can ensure that the operating system is online and operating and/or operating system 350 can ensure that the legacy fabrication tool 335 is online. In some embodiments the regular message can include a randomized and/or encrypted data. The data can include, for example, the serial number of the specific semiconductor fabrication tool and/or other identifying information. In some embodiments the regular message can be sent multiple times a minute.

In some embodiments, a bridge module can be used to convert communication between operating system 350 and legacy fabrication tool(s) 335 in order for operating system 350 to talk with legacy fabrication tool(s) 335. For example, a regular message can be converted from one protocol to another. For example, the bridge module can change the regular message from PCI format to VME format and vice versa. In some embodiments, the bridge module can translate Intel-based communication using Intel-based communication protocols to Motorola based communication using Motorola-based communication protocols and vice-versa. In this way, an Intel processor executing operating system 350 can communicate with Motorola based legacy fabrication tool(s) 335.

Other hardware components 340 can be communicatively coupled with operating system 350 and/or hardware abstraction layer 355. In some embodiments some hardware components 340 can communicate directly with operating system 350. These hardware components may not be legacy hardware components. In some embodiments some hardware components can communicate with operating system 350 through hardware abstraction layer 355. In such embodiments, hardware components that are configured to communicate using communication protocols that are different from what operating system 350 uses can interact with operating system 350.

In some embodiments power control and/or monitoring module(s) 370 can communicate directly with operating system 350 and/or with emulator layer 360. In some embodiments communication with emulator layer 360 can allow power control and/or monitoring module(s) 370 to interact directly with other hardware components. In some embodiments, operating system 350 can manage and/or monitor power consumption. In some embodiments, operating system 350 can also manage temperatures and other parameters using power control and/or monitoring module(s) 370.

In some embodiments, service and support application interface 375 can be communicatively coupled with hardware abstraction layer 355. Service and support application interface 375 can interface with various legacy hardware components through hardware abstraction layer.

In some embodiments hardware abstraction layer can be used to link operating system 350 and legacy applications and data files 320. Moreover, in some embodiments legacy applications and data files 320 includes code for controlling the at least one semiconductor processing chamber. Operating system 350 can control operation of semiconductor processing chambers through hardware abstraction layer 355.

In some embodiments, emulator layer 360 and hardware abstraction layer 355 can be the same layer. In other embodiments, emulator layer 360 and hardware abstraction layer 355 can exist on separate components. In yet other embodiments, emulator layer 360 and hardware abstraction layer 355 exist in software in the same processor. Moreover, in some embodiments, operating system 350 can communicate with Motorola based hardware elements through hardware abstraction layer 355. In some embodiments operating system 350 can communicate with applications and data files using emulator layer 360.

In some embodiments semiconductor fabrication control system can include at least two user interfaces. A first user interface can be used by management to monitor the semiconductor processing parameters and processes. Various parameters such as power consumption, temperatures, timers, alarms, flows, pressures, etc. can be monitored using the first user interface. A second user interface can be used on the operation side to control any of the various semiconductor processing tools. Regardless of where/how the second user interface is coupled with the semiconductor control system, it can provide a legacy interface. That is, it can display applications and/or processes stored in applications and data files 320 coupled with operating system 350 via emulator 360.

Figure 4:
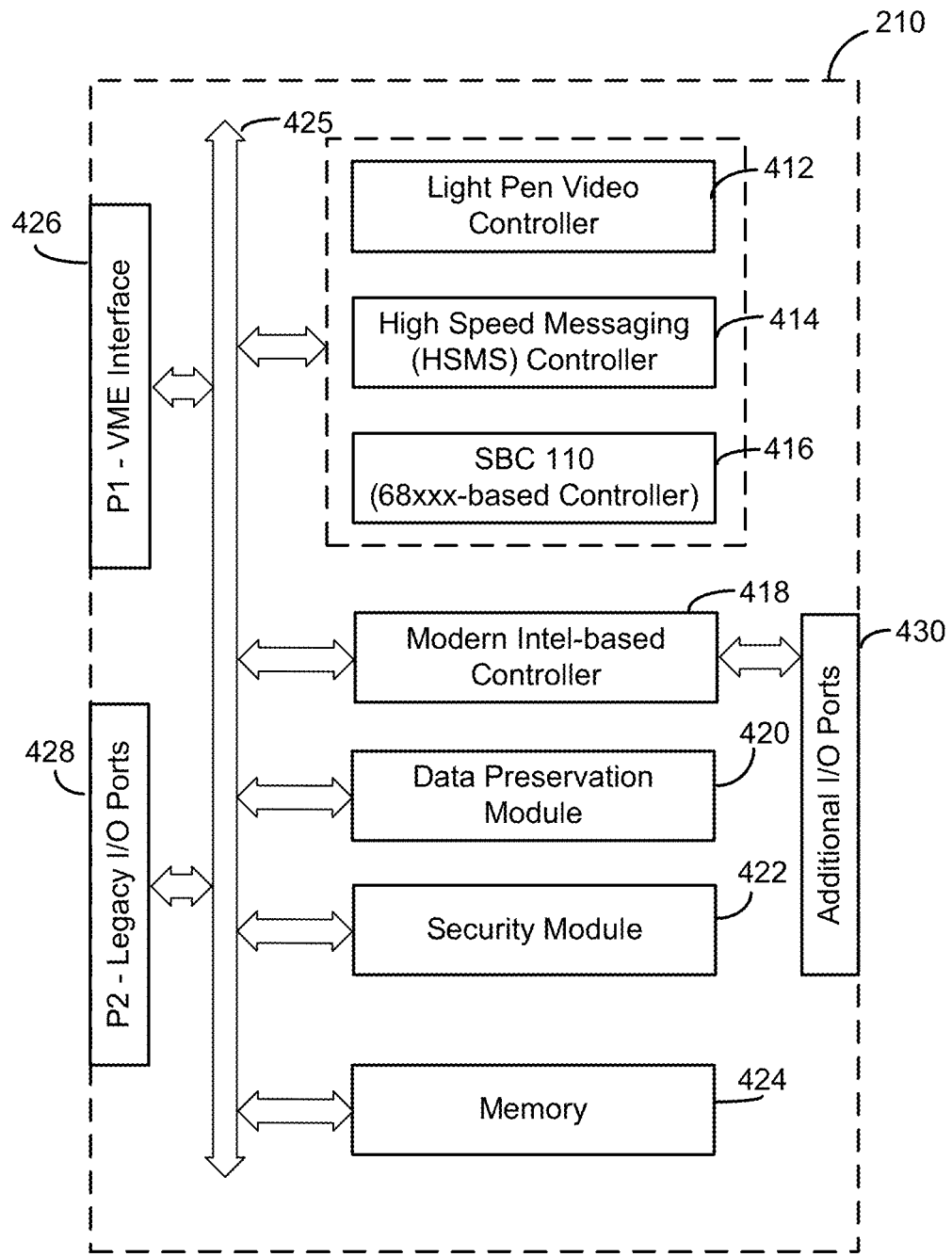
FIG. 4 is a diagram depicting the logical hierarchy of semiconductor processing control system 200 according to one embodiment of the present invention.

Reference is now made to FIG. 4, which is a block diagram of one particular embodiment of SBC 210. While each of the components (blocks) shown in FIG. 4 is represented individually as a single block, a person of skill in the art will appreciate that the blocks do not necessarily represent single or discrete components within SBC 210. Instead, each of the components may include any appropriate combination of hardware and software that enables the described functionality of the component. Additionally, each component shown as part of SBC 210 in FIG. 4 may share portions or all of its hardware and software with other components to achieve the described functionality.

The implementation of SBC 210 shown in FIG. 4 includes a video controller 412 that can emulate the functionality of video controller 104. Video controller 412 can self-adjusts as to raster dot count and format, dot timing, horizontal and vertical sync timing and frame refresh rate to enable semiconductor processing control system 200 to operate with the same cathode ray display tube displays that legacy semiconductor control system 100 incorporates. A high speed messaging controller 414 can also be included that emulates the functionality of HSMS card 108. A control module 416 (e.g., bridge module) can be included that can emulate the legacy 68xxx-based controller of SBC 210 (e.g., a Motorola-based controller). Many components can be communicatively coupled together using bus 425.

A backplane bus interface 426 allows these legacy components, as well as other components of SBC 210, to communicate with backplane bus 120 using the same user I/O connection layouts and signals compatible with the legacy fabrication tools for which SBC 210 has been designed. Backplane bus interface 426 can include a VME connector having 5 rows of 32 pins each. SBC 210 may also include additional legacy I/O port 428 that supports 16 RS-232 serial ports, 2 USB ports, 2 Ethernet ports, a PCIE bus, a light pen interface, an IC bus and a VGA video port. Port 428 can include a second connector having 3 rows of 32 pins each that enables each of the described I/O ports to be connected to rear transition module 212 where individual connectors for each port can be mated with respective connectors on RTM 212. Components 412, 414, 416 and others communicate with backplane bus interface 426 and legacy I/O ports 428 via a PCI express bus.

SBC 210 may also include a data preservation module 420, a security module 422 and a data storage module 424, such as a hard disk drive or flash memory. Data preservation module can operate in conjunction with other components in semiconductor processing control system 200 to save user data to data storage module 424 in the event of a power failure as described above. Similarly, security module 424 operates in conjunction with other components in semiconductor processing control system 200 to implement various hardware and software protection locks unique to each SBC and transition board such that they are mated in production and cannot be cloned or cross-connected to other SBCs or transition boards as described above.

SBC 210 can include an Intel-compatible processor/controller 418 that provides a path forward for control of the legacy fabrication tool without legacy software. Processor/controller 418, for example, can include all or parts of computation system 900 shown in FIG. 9. As shown in FIG. 4, controller 418 is operatively coupled to backplane bus interface 426 and legacy ports 428 as well as to additional I/O ports 430. I/O ports 430 include multiple ports each of which has its own separate connector that enables external devices to connect to and communicate with controller 318. In one embodiment, I/O ports 430 include an independent VGA connector; two Ethernet connectors; two USB connectors; an RS 232 serial port connector; a PS2 keyboard connector and a PS2 mouse connector where devices associated with each of the described connectors can be directly mated with a connector of I/O ports 430 on SBC 210. I/O ports 430 may also include various status lights and both global and local reset switches.

Figure 5:
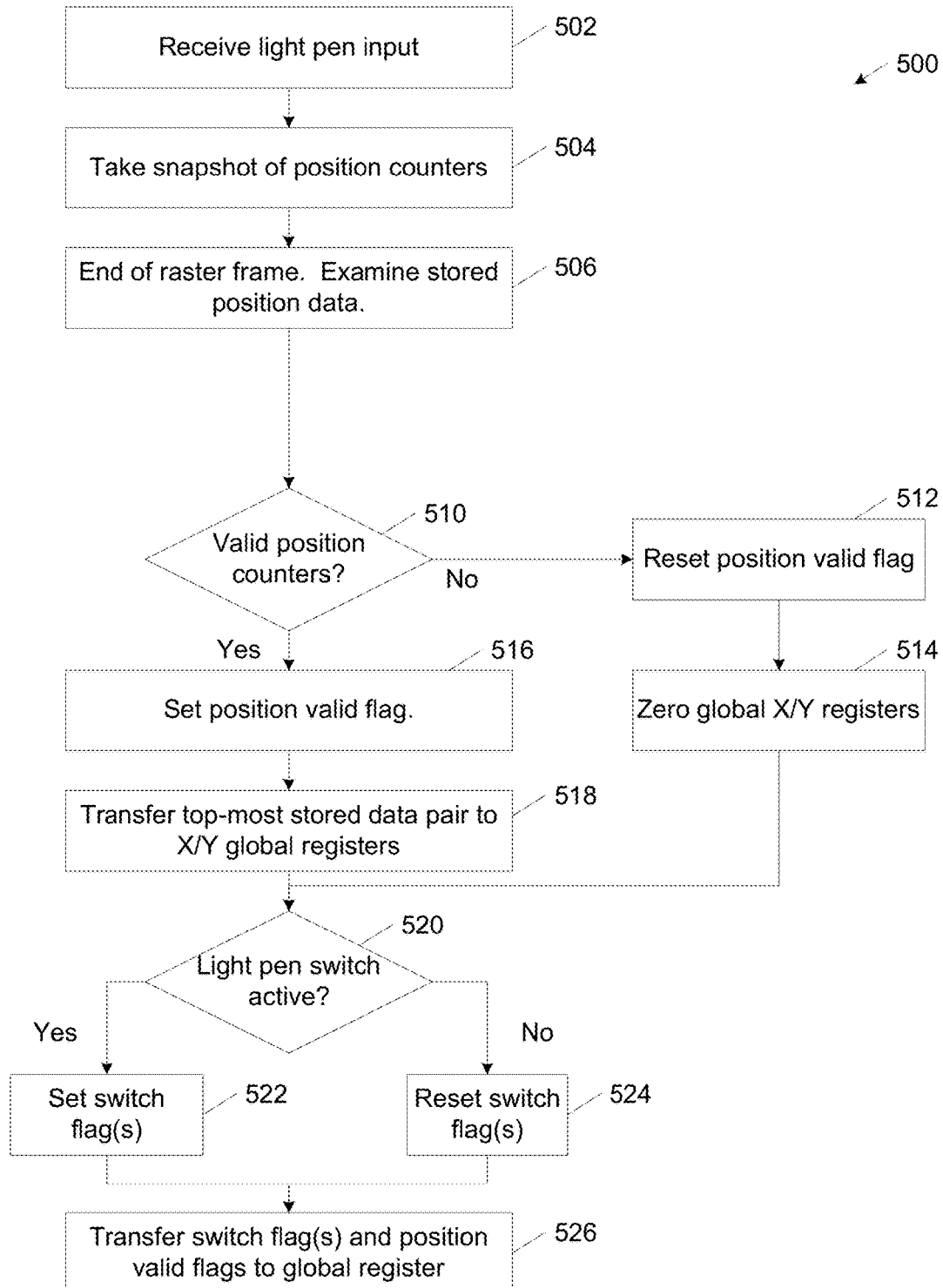
FIG. 5 depicts a technique that can be used by semiconductor processing control system 200 to emulate the functionality video controller 104.

FIG. 5 is a flowchart of process 500 for using a light pen to emulate the functionality of video controller 104. Using process 500, a light pen can be used with any display and still indicate a position value. At block 502 light pen input can be received. This input can include an indication that the button on the light pen was depressed or that the light pen engaged with a touch display. Various signals from either or the light pen, a touch display or both can be received to indicate user input.

When the light pen input has been received a snapshot of the light pen position counters can be taken at block 504. This snapshot can pull light pen position data from a storage location. For instance, light pen position data can be continuously stored in counters such as a vertical and horizontal position counters or registers. This position data can then be stored in a digital storage location. The snapshot can pull the position data from either or both the counter(s) or the storage location associated with the time that the optical signal was received from the light pen.

At block 506 it can be determined if the end of the raster frame has been reached. And, if so, the stored position data can be analyzed.

At block 510 it can be determined whether the position counters are valid. This can include, for example, determining whether the position counters fit within the display area. As another example this can include determining whether the position counters coincide with a position on the display associated with a user input object (e.g., a button, a slide bar, a menu, a radio button, etc.).

If the position counters are not valid then process 500 proceeds to block 512 where the position valid flag (or flags) is reset. At block 514 the global X/Y registers are zeroed.

If the position counters are valid then process 500 proceeds to block 516 where the position valid flag (or flags) is set. At block 518 the top-most stored data pair are transferred to the X/Y global registers.

At block 520 it is determined whether the light pen switch has is activated. If it is, then switch flag(s) are set at block 522. If it is not, then the switch flag(s) are reset at block 524. At block 526 the switch flag(s) and/or the position valid flags can be transferred to the to global register.

Figure 6:
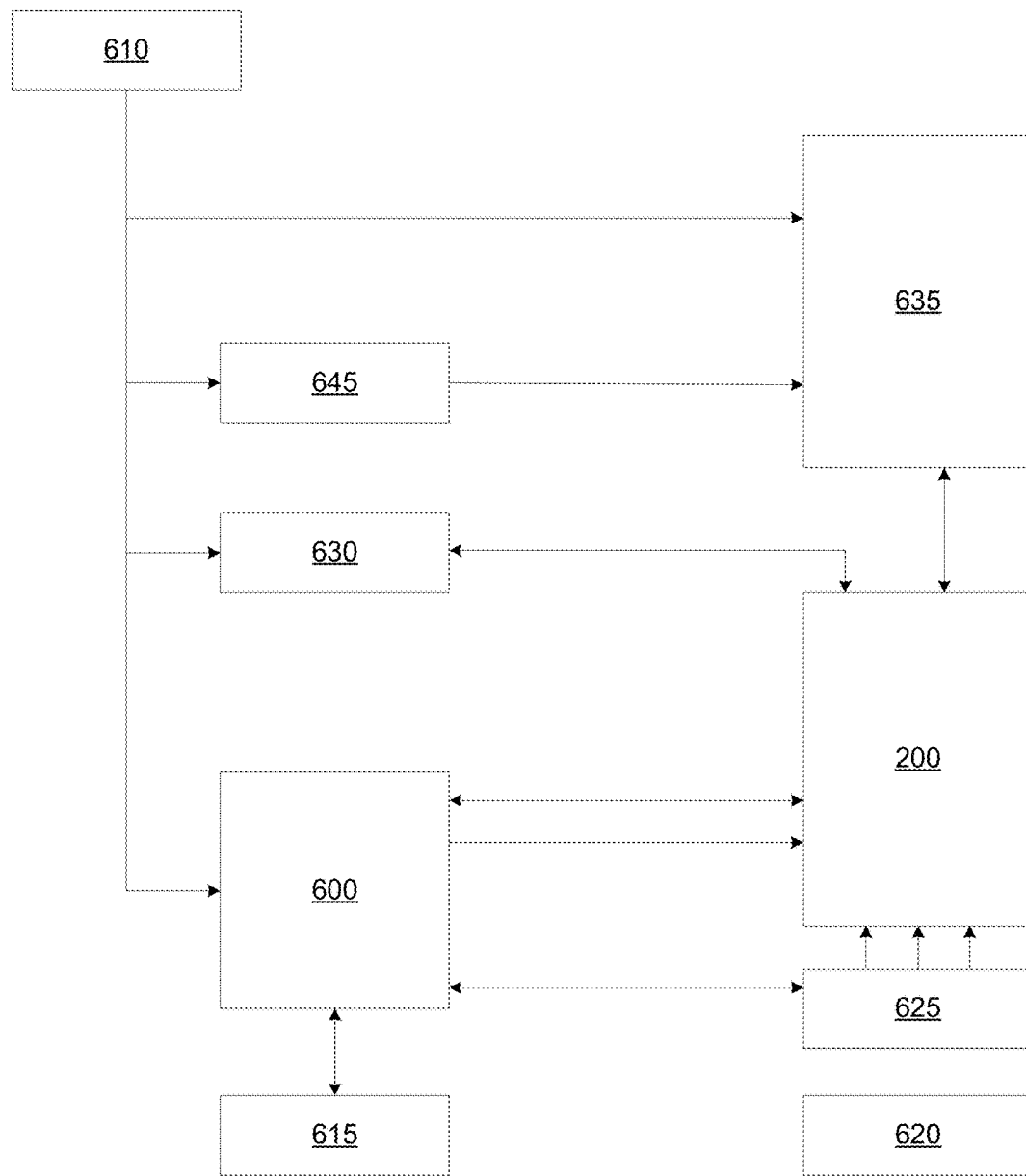
FIG. 6 depicts the larger environment in which semiconductor processing control system 200 may be incorporated including a power supply control module 600 according to an embodiment of the present invention.

FIG. 6 depicts an example of a power management system according to some embodiments of the invention. As shown in FIG. 6, semiconductor processing control system 200 may receive power from a power supply control module 600. Power supply control module 600 may provide power as well as power monitoring. Power supply control module 600 can log data related to the amount of time power is in use, the amount of power used, the variations in the power draw, etc. This power monitoring can monitor the various different components. In some embodiments power monitoring can be used to determine whether a powered device or component is on the fritz by monitoring deviations from standard power draws.

Power supply control module 600 can receive AC power from AC power supply 610 and can provide DC power to semiconductor processing control system 200, service and user displays 620, and fan module 625. Power supply control module 600 can communicate with semiconductor processing control system 200 regarding power consumption and use. Moreover, Power supply control module 600 can monitor power consumption at fan module 625. Power supply control module 600 can be coupled with battery 615 and may control charging of the battery 615 and/or load switching with battery 615.

AC power can be directly provided to operator interface display(s) 630, legacy power supply modules 645, and/or various types of application hardware 635 (e.g., chambers, robots, gas panels, etc.).

Semiconductor processing control system 200 can be in communication, for example, with some or all application hardware 635. These communication channels can communicate sensor data, control data, interlocks, etc. application hardware 635 to semiconductor processing control system 200.

Figure 7:
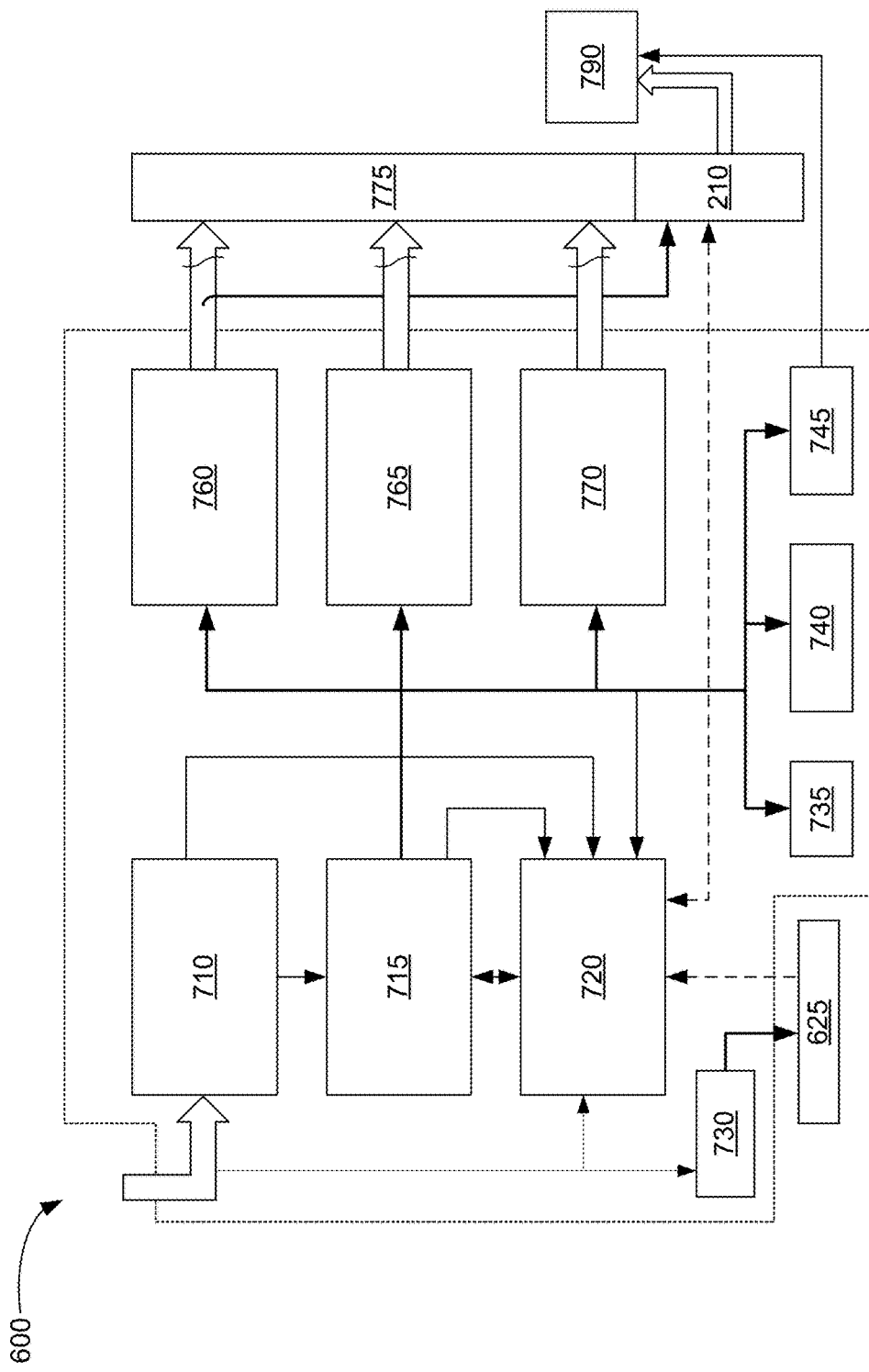
FIG. 7 is a block diagram of power supply control module 600 shown in FIG. 6 according to one embodiment of the present invention.

FIG. 7 is an example of a block diagram of power supply control module 600 according to one embodiment of the present invention. In the figure dotted lines are communication lines and solid lines are power lines. Power supply control module 600 can be an uninterruptible power source sufficient to carry SBC 210 and/or main backplane bus component cards 775 through momentary power dropouts and logic designed to manage the transition between mains and internal supplies transparently. Power supply control module 600 can provide main power conditioning to reduce or eliminate susceptibility to EMI, RFI and general electrical noise and is specifically designed to meet and exceed SEMI F-047 power mains sag carry-through requirements. The outputs of power source 600 can be enhanced with remote (point of load) voltage sensing, point of load noise filtering, specialized cabling to reduce EMI emissions and complexity, and/or integral fail-safe connection-locked logic to shut down in the event of accidental disconnection of the cables at any time. Power supply control module 600 can include a power source controller, which is either handled as a component or handled in software, and can be adapted to alert SBC 210 to shut down in an orderly manner without undue loss of user data in the event of sustained power loss (e.g., not a brief sag or dropout). Power supply control module 600 can include different algorithms that determine the severity of the event and respond accordingly.

Power source 600 can include monitoring capabilities to report overall power status including all or some combination of DC bus voltages; DC bus load currents; incoming main line parameters and quality; temperatures (module and/or CPU core); CPU core loading and backplane bus activity; overall machine state (online, offline, idle, processing, faulted); indicators and/or a visual display (examples: LCD or LED dot matrix). The display may include graphics, color, back lighting, and other useful features and attributes including the ability to highlight errors, out of range excursions and trends. Additionally, power supply control module 600 may be interconnected to a fan module 625 and/or baffle set for SBC 210 that enhances cooling airflow across the SBC board in order to reduce processor heating. The power supply may include monitoring module 720 that monitors fan speed and can trigger an orderly shutdown of semiconductor processing control system 200 in the event of fan failure (e.g., fail safe SBC operation).

In some embodiments, power supply control module 600 can include an AC mains conversion module 710 that receives AC main voltage in and/or can be coupled with source switch and/or battery pack 715 (e.g., battery 615). In this example, three power conversion modules are used, yet any number can be used. These modules can include, for example, +5 volt conversion module 760, +12 volt conversion module 765, and/or −12 volt conversion module 770.

Each of these modules can provide DC voltage to backplane bus 775. Moreover, +5 volt conversation module can provide power to SBC 210.

In some embodiments, fan power converter 730 can receive AC power and provide power to fan pack 625 as either AC or DC power. Internal fans 735, capacitor bank 740, and display power converter 745 can also be implemented. A power status monitor (or user display) 790 can also be used. Power and/or temperature data can also be provided from SBC and/or fans to monitoring module 720. Monitoring module can provide controller and/or processing functionality to power supply control module 600.

Figure 8:
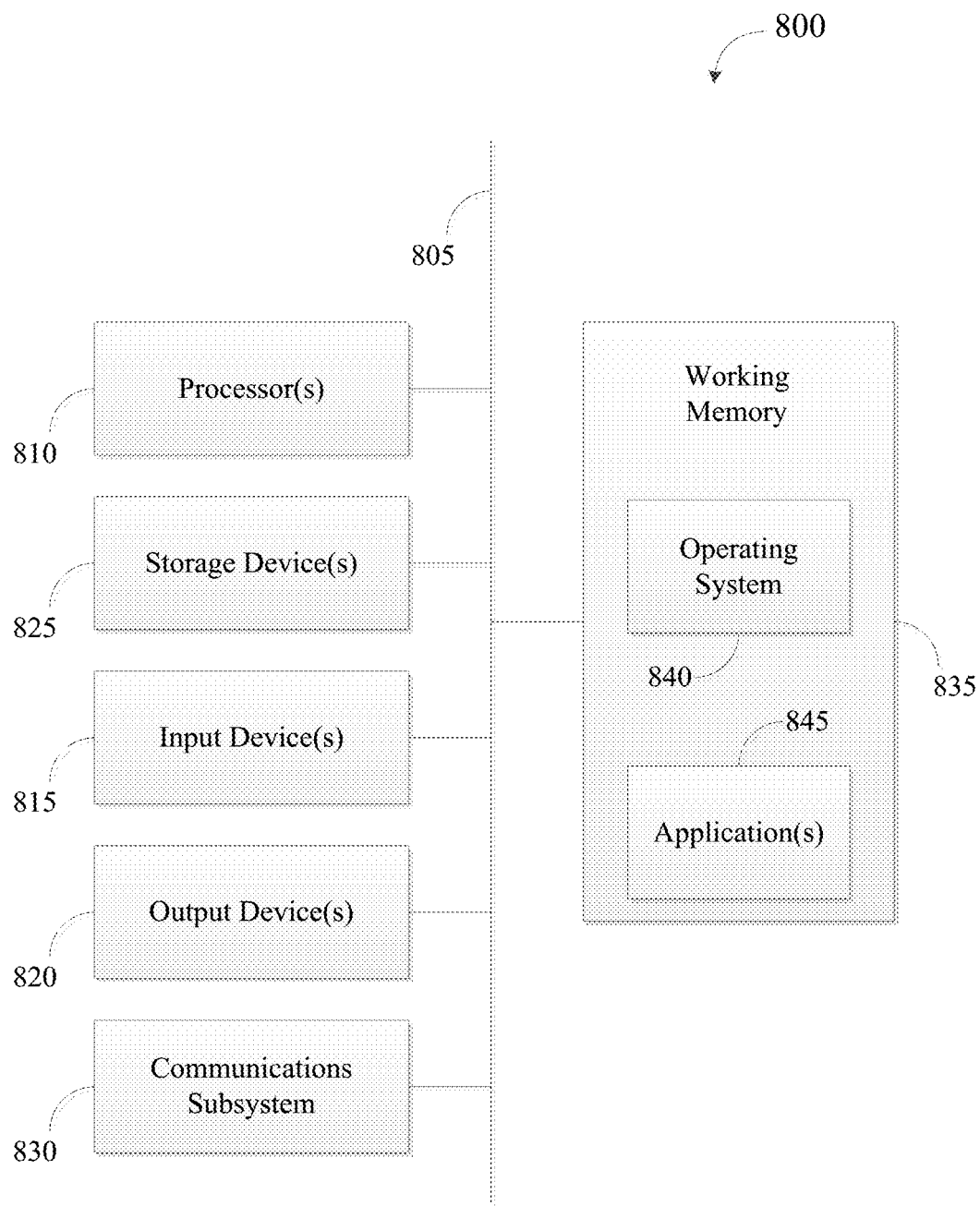
FIG. 8 shows an illustrative computational system for performing functionality to facilitate implementation of embodiments described herein.

The computational system 800, shown in FIG. 8 can be used to perform any of the embodiments of the invention. For example, computational system 800 can be used to execute method 500. As another example, computational system 800 can be used perform any calculation, identification and/or determination described here. Computational system 800 includes hardware elements that can be electrically coupled via a bus 805 (or may otherwise be in communication, as appropriate). The hardware elements can include one or more processors 810, including without limitation one or more general-purpose processors and/or one or more special-purpose processors (such as digital signal processing chips, graphics acceleration chips, and/or the like); one or more input devices 815, which can include without limitation a mouse, a keyboard and/or the like; and one or more output devices 820, which can include without limitation a display device, a printer and/or the like.

The computational system 800 may further include (and/or be in communication with) one or more storage devices 825, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 800 might also include a communications subsystem 830, which can include without limitation a modem, a network card (wireless or wired), an infrared communication device, a wireless communication device and/or chipset (such as a Bluetooth device, an 802.6 device, a WiFi device, a WiMax device, cellular communication facilities, etc.), and/or the like. The communications subsystem 830 may permit data to be exchanged with a network (such as the network described below, to name one example), and/or any other devices described herein. In many embodiments, the computational system 800 will further include a working memory 835, which can include a RAM or ROM device, as described above.

The computational system 800 also can include software elements, shown as being currently located within the working memory 835, including an operating system 840 and/or other code, such as one or more application programs 845, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 825 described above.

In some cases, the storage medium might be incorporated within the computational system 800 or in communication with the computational system 800. In other embodiments, the storage medium might be separate from a computational system 800 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 800 and/or might take the form of source and/or installable code, which, upon compilation and/or installation on the computational system 800 (e.g., using any of a variety of generally available compilers, installation programs, compression/decompression utilities, etc.) then takes the form of executable code.

Having fully described several embodiments of the present invention, many other equivalents or alternative embodiments of the present invention will be apparent to those skilled in the art. As such, the above description is illustrative and not restrictive. These equivalents and/or alternatives are intended to be included within the scope of the present invention.

What is claimed is:

1. A power supply system for a semiconductor processing system, the power supply system comprising:
    an AC adapter configured to convert AC power from an AC power source to DC power;
    a processing tool adapter electrically coupled a semiconductor processing tool, the processing tool adapter configured to provide power from the AC power source to the semiconductor processing tool;
    a DC control system adapter electrically coupled to a DC output of the AC adapter and a semiconductor processing control system, wherein the DC control system adapter is configured to provide DC power to the semiconductor processing control system, and wherein the semiconductor processing control system is configured to control the semiconductor processing tool:
    a DC battery adapter electrically coupled to the DC output of the AC adapter and a battery, the DC battery adapter configured to provide power to the battery; and
    a power supply control subsystem configured to:
        monitor DC power drawn by at least one of the DC output of the AC adapter, the processing tool adapter, or the DC control system adapter during a semiconductor process;
        detect a sustained loss of DC power from the AC adapter based on the monitoring;
        switch a DC power input of the semiconductor processing control system from the DC control system adapter to the battery to provide DC power to the semiconductor processing control system for saving user data for the semiconductor process; and
        trigger an orderly shutdown of the semiconductor processing control system,
        wherein the semiconductor processing control system is configured to, after the DC power from the AC adapter is restored, reload the saved user data for the semiconductor process and resume the semiconductor process based on variables associated with the sustained loss of DC power and the saved user data for the semiconductor process, the variables associated with the sustained loss of DC power determined based on the monitoring.

2. The power supply system of claim 1, wherein the power supply control subsystem is further configured to control charging of the battery.

3. The power supply system of claim 1, wherein the power supply control subsystem is configured to:

monitor a deviation of the DC power drawn by the DC output of the AC adapter, the processing tool adapter, or the DC control system adapter from a standard power drawn by the corresponding adapter; and determine whether the AC adapter, the processing tool adapter, the DC control system adapter, the semiconductor processing tool, the semiconductor processing control system, or the fan subsystem functions properly, based on the deviation.

4. The power supply system of claim 1, wherein the power supply control subsystem is configured to monitor a power consumption by at least one of the semiconductor processing tool, the semiconductor processing control system, or the fan subsystem.

5. The power supply system of claim 1, wherein the power supply control subsystem is configured to monitor temperatures within at least one of the fan subsystem or the semiconductor processing control system.

6. The power supply system of claim 1, wherein the power supply control subsystem is configured to monitor a fan speed of one or more fans within the fan subsystem.

7. The power supply system of claim 6, wherein the power supply control subsystem is further configured to turn off the semiconductor processing control system when the fan subsystem fails.

8. The power supply system of claim 1, wherein the semiconductor processing control system is an external control system.

9. The power supply system of claim 1, wherein the DC power from the AC adapter includes DC power at two or more different levels.

10. The power supply system of claim 1, further comprising an uninterruptible power source configured to provide short term power supply to the semiconductor processing control system when the DC power from the AC adapter drops below a threshold level.

11. The power supply system of claim 10, wherein the uninterruptible power source includes a capacitor bank.

12. The power supply system of claim 10, wherein the power supply control subsystem comprises a control logic configured to manage a power supply transition between the uninterruptible power source and the DC power from the AC adapter.

13. The power supply system of claim 1, wherein the power supply control subsystem is further configured to:
in response to detecting the sustained loss of the DC power from the AC adapter, send an alert signal to the semiconductor processing control system.

14. The power supply system of claim 1, wherein the power supply control subsystem comprises a fail-safe logic configured to shut down the power supply system when a system error is detected.

15. The power supply system of claim 1, wherein the power supply control subsystem comprises a communication adapter communicatively coupled to the semiconductor processing control system for communications between the power supply control subsystem and the semiconductor processing control system.

16. The power supply system of claim 1, wherein the power supply control subsystem is configured to monitor parameters selected from the list consisting of overall power status, DC bus voltages, DC bus load currents, incoming line parameters, fan temperatures, power supply subsystem temperature, control system temperature, control system CPU core loading, Backplane bus activity, and overall machine state.

17. The power supply system of claim 1, further comprising:
a DC fan adapter electrically coupled to the DC output of the AC adapter and a fan subsystem, the DC fan adapter configured to provide power to the fan subsystem.

18. The power supply system of claim 17, wherein:
the power supply control subsystem is further configured to monitor DC power drawn by the DC fan adapter during the semiconductor process.

* * * * *